US011858297B2

(12) United States Patent
Nishio

(10) Patent No.: US 11,858,297 B2
(45) Date of Patent: Jan. 2, 2024

(54) PNEUMATIC TIRE

(71) Applicant: The Yokohama Rubber Co., LTD., Tokyo (JP)

(72) Inventor: Koji Nishio, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/061,768

(22) Filed: Dec. 5, 2022

(65) Prior Publication Data

US 2023/0126372 A1 Apr. 27, 2023

Related U.S. Application Data

(62) Division of application No. 16/345,672, filed as application No. PCT/JP2017/038398 on Oct. 24, 2017.

(30) Foreign Application Priority Data

Oct. 26, 2016 (JP) ................................. 2016-209545

(51) Int. Cl.
*B60C 15/04* (2006.01)
*B60C 15/06* (2006.01)
(Continued)

(52) U.S. Cl.
CPC ............. *B60C 15/04* (2013.01); *B60C 15/02* (2013.01); *B60C 15/024* (2013.01); *B60C 15/06* (2013.01);
(Continued)

(58) Field of Classification Search
CPC .............. B60C 15/04; B60C 2015/042; B60C 2015/044; B60C 2015/046; B60C 2015/048

See application file for complete search history.

(56) References Cited

U.S. PATENT DOCUMENTS 5,261,979 A 11/1993 Caretta
7,513,283 B2 4/2009 Maruoka
(Continued)

FOREIGN PATENT DOCUMENTS

DE 112013005975 T9 11/2018
EP 1080950 A2 7/2001
(Continued)

OTHER PUBLICATIONS

International Search Report for International Application No. PCT/JP2017/038398 dated Jan. 23, 2018, 3 pages, Japan.
(Continued)

*Primary Examiner* — Adrienne C. Johnstone
(74) *Attorney, Agent, or Firm* — Thorpe North & Western

(57) ABSTRACT

With a pneumatic tire not mounted on a rim, in a meridian cross-section a first line is parallel with an innermost bottom side of a bead core in a radial direction and passes through an outermost projection of the bead core in a lateral direction, a second line is orthogonal with the first line at the outermost projection, a third line is orthogonal with the first line and passes through an intersection of a rim cushion rubber, a distance between the second and third lines is 2.0 to 4.0 mm, a shortest distance between an innermost projection of the bead core in the lateral direction and a cord of a carcass layer is 0.6 to 1.4 mm, and a shortest distance between an innermost end of the bottom side of the bead core in the lateral direction and the cord of the carcass layer is 1.2 to 2.2 mm.

4 Claims, 11 Drawing Sheets

(51) Int. Cl.
*B60C 15/02* (2006.01)
*B60C 15/024* (2006.01)

(52) U.S. Cl.
CPC ...... *B60C 15/0603* (2013.01); *B60C 15/0628* (2013.01); *B60C 15/0635* (2013.01); *B60C 2015/044* (2013.01); *B60C 2015/046* (2013.01); *B60C 2015/0621* (2013.01); *B60C 2015/0625* (2013.01); *B60C 2015/0678* (2013.01); *B60C 2015/0692* (2013.01); *Y10T 152/10846* (2015.01)

(56) References Cited

U.S. PATENT DOCUMENTS

| | | | |
|---|---|---|---|
| 8,448,683 | B2 | 5/2013 | Yamazaki |
| 11,173,756 | B2 | 11/2021 | Gohara |
| 11,400,768 | B2 | 8/2022 | Suzuki |
| 2019/0016181 | A1 | 1/2019 | Suzuki |

FOREIGN PATENT DOCUMENTS

| | | |
|---|---|---|
| JP | S60-124511 A | 7/1985 |
| JP | H10-230715 A | 9/1998 |
| JP | H11-189018 A | 7/1999 |
| JP | 2000-085322 A | 3/2000 |
| JP | 2001-191754 A | 7/2001 |
| JP | 3274158 B2 | 4/2002 |
| JP | 2008-062759 A | 3/2008 |
| JP | 4244135 B2 | 3/2009 |
| JP | 2009-126238 A | 6/2009 |
| JP | 2016-022858 A | 2/2016 |
| WO | WO 2017-110643 A1 | 6/2017 |
| WO | WO 2017-111114 A1 | 6/2017 |

OTHER PUBLICATIONS

Decision To Grant A Patent dated Dec. 11, 2018, 6 pages, Japan.
English machine translation of JP 60124511 A, Jul. 3, 1985.

|  | CONVENTIONAL EXAMPLE 1 | COMPARATIVE EXAMPLE 1 | COMPARATIVE EXAMPLE 2 | COMPARATIVE EXAMPLE 3 |
|---|---|---|---|---|
| ORGANIC FIBER REINFORCED LAYER | NO | NO | NO | NO |
| NUMBER OF ORGANIC FIBER REINFORCED LAYERS (NUMBER) | - | - | - | - |
| DISTANCE A (mm) | 0.10 | 4.50 | 0.60 | 0.60 |
| DISTANCE B (mm) | 0.32 | 2.15 | 1.80 | 0.50 |
| GAUGE OF RUBBER LAYER IN DISTANCE B (mm) | 0.32 | 2.15 | 1.80 | 0.50 |
| DISTANCE C (mm) | 0.80 | 3.50 | 2.50 | 1.20 |
| GAUGE OF RUBBER LAYER IN DISTANCE C (mm) | 0.80 | 3.50 | 2.50 | 1.20 |
| FILLER COVER LAYER | NO | NO | YES | YES |
| MATERIAL OF FILLER COVER LAYER | - | - | RUBBER LAYER | RUBBER LAYER |
| JIS-A HARDNESS OF RUBBER LAYER OF FILLER COVER LAYER | - | - | 80 | 62 |
| BEAD COVER LAYER | YES | YES | YES | YES |
| MATERIAL OF BEAD COVER LAYER | RUBBER LAYER | RUBBER LAYER | RUBBER LAYER | RUBBER LAYER |
| JIS-A HARDNESS OF RUBBER LAYER OF BEAD COVER LAYER | 90 | 90 | 90 | 90 |
| LIFTING AMOUNT REDUCTION PERFORMANCE ON BEAD TOE PORTION | 100 | 185 | 105 | 105 |
| SEPARATION DURABILITY PERFORMANCE ON OUTER EDGE PORTION OF CARCASS LAYER FOLDED BACK PORTION | 100 | 65 | 70 | 97 |
| HEAT BUILD-UP RESISTANCE PERFORMANCE ON BEAD PORTION | 100 | 45 | 85 | 98 |

FIG. 8A

|  | EXAMPLE 1 | EXAMPLE 2 | EXAMPLE 3 | EXAMPLE 4 | EXAMPLE 5 | EXAMPLE 6 |
|---|---|---|---|---|---|---|
| ORGANIC FIBER REINFORCED LAYER | NO | NO | NO | NO | NO | NO |
| NUMBER OF ORGANIC FIBER REINFORCED LAYERS (NUMBER) | - | - | - | - | - | - |
| DISTANCE A (mm) | 2.00 | 4.00 | 2.50 | 3.00 | 3.00 | 3.00 |
| DISTANCE B (mm) | 0.60 | 1.40 | 1.03 | 1.20 | 1.20 | 1.20 |
| GAUGE OF RUBBER LAYER IN DISTANCE B (mm) | 0.60 | 1.40 | 1.03 | 1.20 | 0.52 | 0.52 |
| DISTANCE C (mm) | 1.20 | 2.20 | 1.68 | 1.90 | 1.90 | 1.90 |
| GAUGE OF RUBBER LAYER IN DISTANCE C (mm) | 1.20 | 2.20 | 1.68 | 1.70 | 1.22 | 1.22 |
| FILLER COVER LAYER | YES | YES | YES | YES | YES | YES |
| MATERIAL OF FILLER COVER LAYER | RUBBER LAYER | RUBBER LAYER | RUBBER LAYER | RUBBER LAYER | RUBBER LAYER + NYLON REINFORCING LAYER | RUBBER LAYER |
| JIS-A HARDNESS OF RUBBER LAYER OF FILLER COVER LAYER | 72 | 72 | 72 | 72 | 72 | 72 |
| BEAD COVER LAYER | YES | YES | YES | YES | YES | YES |
| MATERIAL OF BEAD COVER LAYER | RUBBER LAYER | RUBBER LAYER | RUBBER LAYER | RUBBER LAYER | RUBBER LAYER | RUBBER LAYER + NYLON REINFORCING LAYER |
| JIS-A HARDNESS OF RUBBER LAYER OF BEAD COVER LAYER | 90 | 90 | 90 | 90 | 90 | 90 |
| LIFTING AMOUNT REDUCTION PERFORMANCE ON BEAD TOE PORTION | 115 | 175 | 150 | 145 | 145 | 145 |
| SEPARATION DURABILITY PERFORMANCE ON OUTER EDGE PORTION OF CARCASS LAYER FOLDED BACK PORTION | 92 | 85 | 85 | 89 | 95 | 95 |
| HEAT BUILD-UP RESISTANCE PERFORMANCE ON BEAD PORTION | 96 | 80 | 90 | 88 | 94 | 94 |

FIG. 8B

|  | CONVENTIONAL EXAMPLE 2 | COMPARATIVE EXAMPLE 4 | COMPARATIVE EXAMPLE 5 | COMPARATIVE EXAMPLE 6 |
|---|---|---|---|---|
| ORGANIC FIBER REINFORCED LAYER | YES | YES | YES | YES |
| NUMBER OF ORGANIC FIBER REINFORCED LAYERS (NUMBER) | 2 | 2 | 2 | 2 |
| THICKNESS OF ONE ORGANIC FIBER REINFORCED LAYER (mm) | 1.0 | 1.0 | 1.0 | 1.0 |
| DISTANCE A (mm) | 1.10 | 2.20 | 1.85 | 1.85 |
| DISTANCE B (mm) | 0.32 | 0.70 | 0.50 | 1.80 |
| GAUGE OF RUBBER LAYER IN DISTANCE B (mm) | 0.32 | 0.70 | 0.50 | 1.80 |
| DISTANCE C (mm) | 0.80 | 1.58 | 1.20 | 2.50 |
| GAUGE OF RUBBER LAYER IN DISTANCE C (mm) | 0.80 | 1.58 | 1.20 | 2.50 |
| FILLER COVER LAYER | NO | YES | YES | YES |
| MATERIAL OF FILLER COVER LAYER | - | RUBBER LAYER | RUBBER LAYER | RUBBER LAYER |
| JIS-A HARDNESS OF RUBBER LAYER OF FILLER COVER LAYER | - | 72 | 62 | 80 |
| BEAD COVER LAYER | YES | YES | YES | YES |
| MATERIAL OF BEAD COVER LAYER | RUBBER LAYER | RUBBER LAYER | RUBBER LAYER | RUBBER LAYER |
| JIS-A HARDNESS OF RUBBER LAYER OF BEAD COVER LAYER | 90 | 90 | 90 | 90 |
| LIFTING AMOUNT REDUCTION PERFORMANCE ON BEAD TOE PORTION | 100 | 120 | 103 | 103 |
| SEPARATION DURABILITY PERFORMANCE ON OUTER EDGE PORTION OF CARCASS LAYER FOLDED BACK PORTION | 100 | 90 | 95 | 70 |
| HEAT BUILD-UP RESISTANCE PERFORMANCE ON BEAD PORTION | 100 | 95 | 97 | 88 |

FIG. 9A

| | EXAMPLE 7 | EXAMPLE 8 | EXAMPLE 9 | EXAMPLE 10 |
|---|---|---|---|---|
| ORGANIC FIBER REINFORCED LAYER | YES | YES | YES | YES |
| NUMBER OF ORGANIC FIBER REINFORCED LAYERS (NUMBER) | 2 | 2 | 2 | 2 |
| THICKNESS OF ONE ORGANIC FIBER REINFORCED LAYER (mm) | 1.0 | 1.0 | 1.0 | 1.0 |
| DISTANCE A (mm) | 5.50 | 5.92 | 5.92 | 5.92 |
| DISTANCE B (mm) | 1.20 | 1.34 | 1.34 | 1.34 |
| GAUGE OF RUBBER LAYER IN DISTANCE B (mm) | 1.20 | 1.34 | 0.74 | 0.74 |
| DISTANCE C (mm) | 1.82 | 2.18 | 2.18 | 2.18 |
| GAUGE OF RUBBER LAYER IN DISTANCE C (mm) | 1.82 | 2.18 | 1.64 | 1.64 |
| FILLER COVER LAYER | YES | YES | YES | YES |
| MATERIAL OF FILLER COVER LAYER | RUBBER LAYER | RUBBER LAYER | RUBBER LAYER + NYLON REINFORCING LAYER | RUBBER LAYER |
| JIS-A HARDNESS OF RUBBER LAYER OF FILLER COVER LAYER | 72 | 72 | 72 | 72 |
| BEAD COVER LAYER | YES | YES | YES | YES |
| MATERIAL OF BEAD COVER LAYER | RUBBER LAYER | RUBBER LAYER | RUBBER LAYER | RUBBER LAYER + NYLON REINFORCING LAYER |
| JIS-A HARDNESS OF RUBBER LAYER OF BEAD COVER LAYER | 90 | 90 | 90 | 90 |
| LIFTING AMOUNT REDUCTION PERFORMANCE ON BEAD TOE PORTION | 160 | 180 | 180 | 180 |
| SEPARATION DURABILITY PERFORMANCE ON OUTER EDGE PORTION OF CARCASS LAYER FOLDED BACK PORTION | 88 | 83 | 93 | 93 |
| HEAT BUILD-UP RESISTANCE PERFORMANCE ON BEAD PORTION | 83 | 83 | 90 | 90 |

FIG. 9B

PNEUMATIC TIRE

RELATED APPLICATIONS

This application is a divisional of U.S. patent application Ser. No. 16/345,672, filed on Aug. 8, 2019, which is the National Stage of International Patent Application No. PCT/JP2017/038398, filed on Oct. 24, 2017, which claims the benefit of priority from Japan Patent Application No. 2016-209545, filed on Oct. 26, 2016.

TECHNICAL FIELD

The present technology relates to a pneumatic tire.

BACKGROUND ART

Known pneumatic tires with a rubber layer disposed around a bead core are described in Japan Unexamined Patent Publication Nos. 60-124511, 2001-191754 and 10-230715 as well as in Japan Patent Nos. 4244135 and 3274158.

Heavy duty pneumatic tires used on trucks, buses, and the like, can be retread by replacing the tread portion and reusing the base tire other than tread portion. After the first lifecycle of such a base tire before replacement, a phenomenon known as lifting may have occurred in which the bead toe portion lifts outward in the tire radial direction, on a separating state from the rim. When a base tire with such a phenomenon is retread the tread portion, it is difficult to inflate such a tire, As a result, marketability is reduced, thus the tire may be deemed unable to be retread.

SUMMARY

The present technology provides a pneumatic tire that can prevent lifting of a bead toe portion.

A pneumatic tire according to an aspect of the present technology includes a pair of bead cores disposed on either side in a tire lateral direction, each one of the pair of bead cores being formed by a bead wire being wound a plurality of times in a tire circumferential direction, a carcass layer including an each end portion folded back on each one of the pair of bead cores, a cover member covering the bead core disposed on a folded back inner side of the carcass layer, a steel cord reinforcing layer disposed adjacent to a folded back outer surface of the carcass layer, and a rim cushion rubber disposed adjacent to an outer surface of the steel cord reinforcing layer and including a bead base portion and a bead outer surface portion, the bead base portion forming a contour of an inner surface of a bead portion in a tire radial direction, and the bead outer surface portion forming a contour of an outer surface of the bead portion in the tire lateral direction continuous to the outer end of the bead base portion in the tire lateral direction via an intersection point, wherein in a meridian cross-section under a state with the pneumatic tire not mounted on a rim, a line segment being parallel with an innermost bottom side of the bead core in the tire radial direction and passing through an outermost outer projection point of the bead core in the tire lateral direction is specified as a first line segment, a line segment being orthogonal with the first line segment at a position of the outer projection point is specified as a second line segment, and a line segment being orthogonal with the first line segment and passing through the intersection point of the rim cushion rubber is specified as a third line segment, a distance A between the second line segment and the third line segment is from 2.0 mm to 4.0 mm, a shortest distance B between an innermost inner projection point of the bead core in the tire lateral direction and a carcass cord of the carcass layer is from 0.6 mm to 1.4 mm, and a shortest distance C between an innermost end of the bottom side of the bead core in the tire lateral direction and a carcass cord of the carcass layer is from 1.2 mm to 2.2 mm.

According to the pneumatic tire, by the shortest distance B being 0.6 mm or greater and the shortest distance C being 1.2 mm or greater, excessive restriction of the carcass layer is alleviated when the pneumatic tire is formed via vulcanization. Thus, outward-acting pressure on the bead core in the tire lateral direction during vulcanization can be reduced, and pressing on the bead core to a bead heel portion side can be suppressed. As a result, the bead core can be disposed close to a bead toe portion. When the shortest distance B is greater than 1.4 mm and the shortest distance C is greater than 2.2 mm, the restricting force on the carcass layer is dramatically decreased. This may incite unpreferable cracking from the outer edge portion of the folded back carcass layer. By setting the distance A to 2.0 mm or greater, the bead core can be disposed close to the bead toe portion, and lifting of the bead toe portion can be prevented. Additionally, by setting the distance A to 4.0 mm or less, an excessive increase in the rubber volume between the bead core and the steel cord reinforcing layer located outward of the bead core in the tire lateral direction is suppressed. This allows the heat build-up of the bead portion to be suppressed to within an incident-free predetermined range.

A pneumatic tire according to another aspect of the present technology includes a pair of bead cores disposed on either side in a tire lateral direction, each one of the pair of bead cores being formed by a bead wire being wound a plurality of times in a tire circumferential direction, a carcass layer including an each end portion folded back on each one of the pair of bead cores, a cover member covering the bead core disposed on a folded back inner side of the carcass layer, a steel cord reinforcing layer disposed adjacent to a folded back outer surface of the carcass layer, at least one organic fiber reinforced layer disposed along an outer surface of the steel cord reinforcing layer, and a rim cushion rubber disposed adjacent to an outer surface of the at least one organic fiber reinforced layer and including a bead base portion and a bead outer surface portion, the bead base portion forming a contour of an inner surface of a bead portion in a tire radial direction, and the bead outer surface portion forming a contour of an outer surface of the bead portion in the tire lateral direction continuous to the outer end of the bead base portion in the tire lateral direction via an intersection point, wherein in a meridian cross-section under a state with the pneumatic tire not mounted on a rim, a line segment being parallel with an innermost bottom side of the bead core in the tire radial direction and passing through an outermost outer projection point of the bead core in the tire lateral direction is specified as a first line segment, a line segment being orthogonal with the first line segment at a position of the outer projection point is specified as a second line segment, a line segment being orthogonal with the first line segment and passing through the intersection point of the rim cushion rubber is specified as a third line segment, a number n of the organic fiber reinforced layer is from 1 to 3, and a thickness d per each of the at least one organic fiber reinforced layer is from 0.7 mm to 1.2 mm, a distance A between the second line segment and the third line segment is from n×d+2.0 mm to n×d+4.0 mm, a shortest distance B between an innermost inner projection point of the bead core in the tire lateral direction and a carcass cord of the carcass layer is from 0.6 mm to 1.4 mm, and a shortest distance C between an innermost end of the bottom side of the bead core in the tire lateral direction and a carcass cord of the carcass layer is from 1.2 mm to 2.2 mm.

According to the pneumatic tire, by the shortest distance B being 0.6 mm or greater and the shortest distance C being 1.2 mm or greater, the excessive restriction of the carcass layer is alleviated when the pneumatic tire is formed via vulcanization. Thus, outward-acting pressure on the bead core in the tire lateral direction during vulcanization can be reduced, and pressing on the bead core to a bead heel portion side can be suppressed. As a result, the bead core can be disposed close to the bead toe portion. When the shortest distance B is greater than 1.4 mm and the shortest distance C is greater than 2.2 mm, the restricting force on the carcass layer is dramatically decreased. This may incite unpreferable cracking from the outer edge portion of the folded back carcass layer. By setting the distance A to n×d+2.0 mm or greater, the bead core can be disposed close to the bead toe portion, and the lifting of the bead toe portion can be prevented. Additionally, by setting the distance A to n×d+4.0 mm or less, an excessive increase in the rubber volume between the bead core and the steel cord reinforcing layer located outward of the bead core in the tire lateral direction is suppressed. This allows the heat build-up of the bead portion to be suppressed to within an incident-free predetermined range.

In a pneumatic tire according to an aspect of the present technology, preferably, the cover member includes a bead cover layer surrounding the bead core and a filler cover layer disposed adjacent to an outer surface of the bead cover layer and along an inner surface of the carcass layer, the filler cover layer is disposed to extend outward in the tire radial direction along the carcass layer beyond an area of 15 mm or greater centered on the inner projection point of the bead core, and a JIS (Japanese Industrial Standard)-A hardness of a rubber layer constituting the filler cover layer is from 68 to 76 and is less than a JIS-A hardness of a rubber layer constituting the bead cover layer.

According to the pneumatic tire, by disposing the filler cover layer, an effect of alleviating restriction on the carcass layer can be significantly obtained. As a result, the bead core can be disposed close to the bead toe portion and the distance A can be ensured. When the JIS-A hardness of the rubber layer constituting the filler cover layer is 68 or greater, an excessive rubber flow can be suppressed during vulcanization. As a result, the bead core can be disposed close to the bead toe portion. When the JIS-A hardness of the rubber layer constituting the filler cover layer is 76 or less, an effect of alleviating the restricting force on the carcass layer during vulcanization can be ensured. As a result, the bead core can be disposed close to the bead toe portion. By the JIS-A hardness of the rubber layer constituting the filler cover layer being less (softer) than the JIS-A hardness of the rubber layer constituting the bead cover layer, an effect of alleviating the restricting force on the carcass layer during vulcanization and an effect of suppressing the excessive rubber flow can be obtained in a compatible manner.

In a pneumatic tire according to an aspect of the present technology, preferably, the cover member includes a bead cover layer surrounding the bead core and a filler cover layer disposed adjacent to an outer surface of the bead cover layer and along an inner surface of the carcass layer, one of the filler cover layer or the bead cover layer is a two-layer structure laminating a rubber layer and a nylon reinforcing layer, and a thickness of a rubber layer associated with the shortest distance B is 0.5 mm or greater.

In the pneumatic tire, one of the filler cover layer or the bead cover layer is a two-layer structure laminating a rubber layer and a nylon reinforcing layer, so that the shortest distances B and C can be secured without deteriorating the heat build-up. When the thickness of the rubber layer associated with the shortest distance B is 0.5 mm or greater, an effect of alleviating the restricting force on the carcass layer during vulcanization can be sufficiently ensured. As a result, the bead core can be disposed close to the bead toe portion.

According to the present technology, bead toe portion lifting can be prevented.

BRIEF DESCRIPTION OF DRAWINGS

FIGS. 8A-8B include a table showing the results of performance tests of pneumatic tires according to examples of the first embodiment.

FIGS. 9A-9B include a table showing the results of performance tests of pneumatic tires according to examples of the second embodiment.

DETAILED DESCRIPTION

Embodiments of the present technology will be described with reference to the drawings. However, the present technology is not limited to those embodiments. Additionally, in other embodiments, constituents described in the embodiments below may be combined or a constituent may be omitted.

Herein, "tire lateral direction" refers to the direction that is parallel with a tire rotation axis of a pneumatic tire. "Inward in the tire lateral direction" refers to the direction toward the tire equatorial plane in the tire lateral direction. "Outward in the tire lateral direction" refers to the direction away from the tire equatorial plane in the tire lateral direction. Furthermore, "tire radial direction" refers to the direction orthogonal to the tire rotation axis. "Inward in the tire radial direction" refers to the direction toward the tire rotation axis in the tire radial direction. "Outward in the tire radial direction" refers to the direction away from the tire rotation axis in the tire radial direction. "Tire circumferential direction" refers to the direction of rotation about the tire rotation axis.

"Tire equatorial plane" refers to a plane that is orthogonal to the tire rotation axis and runs centrally in the tire lateral direction. "Tire equator line" refers to the centerline where the tire equatorial plane intersects the surface of the tread portion of the pneumatic tire.

A pneumatic tire 1 of the present embodiment is a tubeless tire. The pneumatic tire 1 of the present embodiment is a heavy duty pneumatic tire mountable on a truck or a bus. "Truck and bus tire" (heavy duty pneumatic tire) refers to a tire specified in Section C of the JATMA YEAR BOOK published by the Japan Automobile Tyre Manufacturers Association, Inc. (JATMA). Note that the pneumatic tire 1 may be mountable on a passenger vehicle or mountable on a light truck.

First Embodiment

Figure 1:
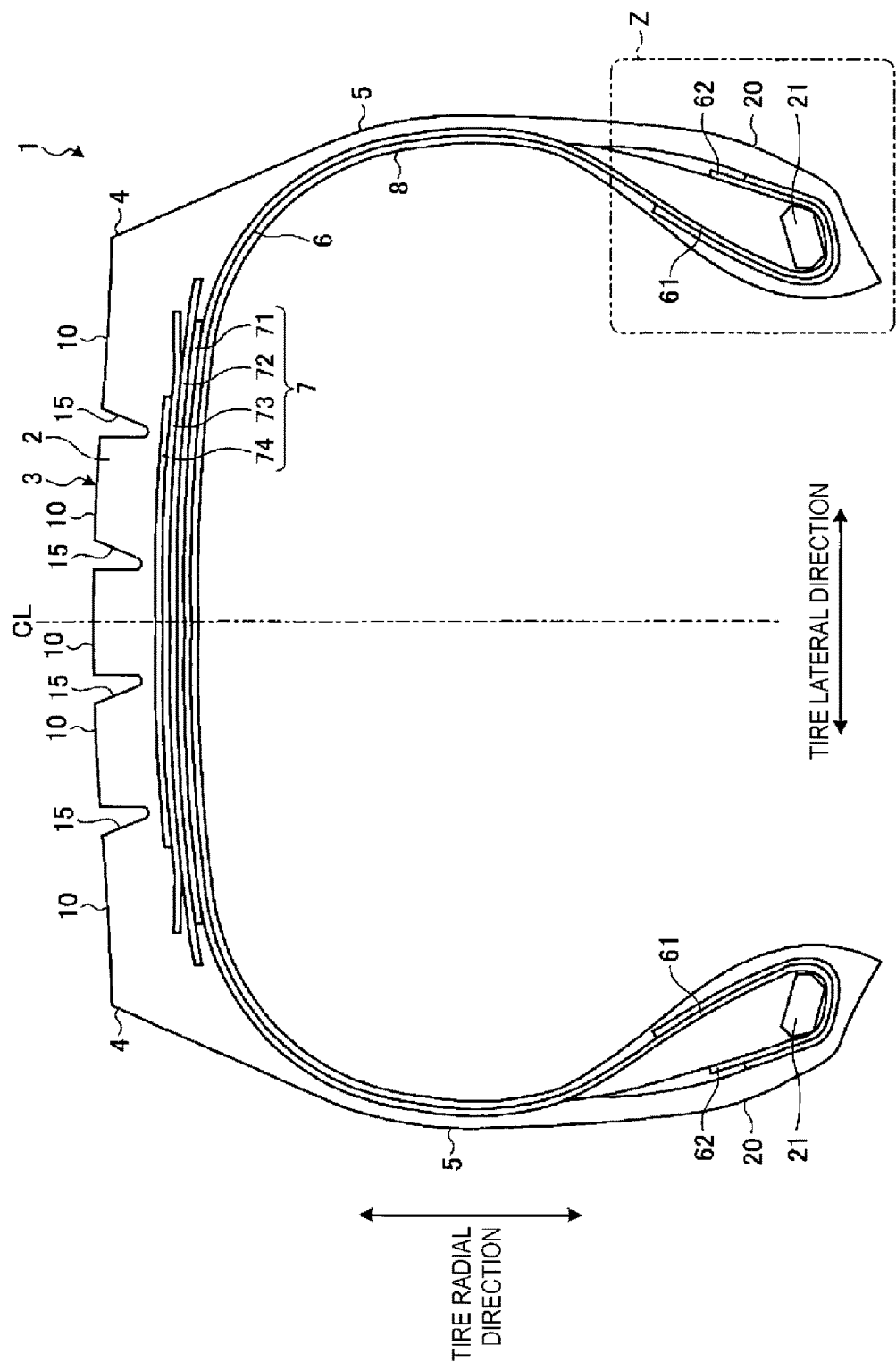
FIG. 1 is a meridian cross-sectional view illustrating a main portion of a pneumatic tire according to a first embodiment.

FIG. 1 is a meridian cross-sectional view illustrating a main portion of the pneumatic tire 1 according to an embodiment. "Meridian cross-section" refers to a cross section that passes through the tire rotation axis.

In the pneumatic tire 1 illustrated in FIG. 1, when viewed in the meridian cross-section, a tread portion 2 is disposed in the outermost portion in the tire radial direction. The surface of the tread portion 2 is formed as a tread surface 3, which is the portion that comes into contact with a road surface when a vehicle mounted with the pneumatic tire 1 is running. A plurality of circumferential main grooves 15 are formed in the tread surface 3 in the tire lateral direction. The circumferential main grooves extend in the tire circumferential direction. Though not illustrated in the drawings, a plurality of lug grooves may be formed in the tread surface 3 in the tire circumferential direction. The lug grooves extend in a direction that intersects the circumferential main grooves 15. A plurality of land portions 10 are defined in the tread surface 3 by the circumferential main grooves 15 and the lug grooves. Note that the number of the circumferential main grooves 15 and the interval between the lug grooves in the tire circumferential direction, the length and angle of the lug grooves, the groove width and groove depth of the each groove, and the like are preferably set as appropriate. In other words, the tread pattern formed in the tread surface 3 is preferably set as appropriate.

Ends of the tread portion 2 in the tire lateral direction are formed as shoulder portions 4. Sidewall portions 5 are disposed from the shoulder portions 4 to predetermined positions inward in the tire radial direction. In other words, the sidewall portions 5 are disposed at two positions on either side of the pneumatic tire 1 in the tire lateral direction.

Furthermore, a bead portion 20 is located inward of each of the sidewall portions 5 in the tire radial direction. The bead portions 20 are disposed at two positions on either side of the tire equatorial plane CL in a similar manner as the sidewall portions 5. In other words, the pair of bead portions 20 are disposed on both sides of the tire equatorial plane CL in the tire lateral direction. Each of the pair of bead portions 20 is provided with a bead core 21. The bead core 21 is formed by winding a bead wire 21A (see FIG. 4), which is a steel wire, into an annular shape.

The bead portion 20 is configured to be mounted on a 15° tapered specified rim. Here, "specified rim" refers to an "applicable rim" specified by the Japan Automobile Tyre Manufacturers Association (JATMA), a "Design Rim" specified by the Tire and Rim Association (TRA), or a "Measuring Rim" specified by the European Tyre and Rim Technical Organisation (ETRTO). That is, the pneumatic tire 1 according to the present embodiment can be mounted on a specified rim in which a portion to which the bead portion 20 engages is inclined at an inclination angle of 15° with respect to the rotation axis.

A belt layer 7 is provided inward of the tread portion 2 in the tire radial direction. The belt layer 7, for example, is a multilayer structure including four belts 71, 72, 73 and 74. The belts 71, 72, 73 and 74 are made by performing a rolling process on coating rubber-covered belt cords made of steel. An inclination angle of the belts 71, 72, 73 and 74 with respect to the tire circumferential direction is set in a range from 15° to 70°, for example. At least two of the belts of the belt layer 7 are disposed so that the belt cords of the different layers are arranged in a criss-cross manner. The belt cords of the second and third belts 72 and 73 from the tire inner circumferential side, which function as strength layers, are arranged in a criss-cross manner. The belt cords of the first and second belts 71 and 72 from the tire inner circumferential side are inclined in the same direction. The belt cords of the third and fourth belts 73 and 74 from the tire inner circumferential side are also inclined in the same direction.

A carcass layer 6 including cords of a radial ply is provided in a continuous manner inward of the belt layer 7 in the tire radial direction and inside the sidewall portions 5. The carcass layer 6 is supported by the pair of bead cores 21. The carcass layer 6 has a single layer structure made of one carcass ply and is disposed between the bead cores 21 on either side in the tire lateral direction in a toroidal shape in the tire circumferential direction, constituting the framework of the pneumatic tire 1. Specifically, the carcass layer 6 is disposed from one bead portion 20 to the other bead portion 20 located on either side in the tire lateral direction and turns back outward in the tire lateral direction along the bead cores 21 at the bead portions 20, wrapping around the bead cores 21. In other words, the carcass layer 6 is disposed from the inner side of the bead core 21 in the tire lateral direction, passes the inner side of the bead core 21 in the tire radial direction, and extends to the outer side of the bead core 21 in the tire lateral direction, with the carcass layer 6 being folded back around the bead core 21 at the bead portion 20. The carcass ply of the carcass layer 6 disposed in this manner is made by performing a rolling process on coating rubber-covered carcass cords 6A (see FIG. 4) made of steel.

Hereinafter, for the carcass layer 6 located at the bead portion 20 that is folded back at the bead core 21, the portion disposed further inward than the bead core 21 in the tire lateral direction is defined, as appropriate, as a body portion 61, and the portion that is formed by the carcass layer 6 being folded back at the bead core 21 and disposed further outward than the bead core 21 in the tire lateral direction is defined, as appropriate, as a folded back portion 62.

Additionally, an innerliner 8 is formed along the carcass layer 6 inward of the carcass layer 6 or on the inner side of the carcass layer 6 in the pneumatic tire 1. The innerliner 8 is the tire inner surface, i.e. the inner circumferential surface of the carcass layer 6, reaches the lower portions of the bead cores 21 and/or bead toes of the pair of bead portions 20 at both end portions in the tire lateral direction, and extends in the tire circumferential direction in a toroidal shape. The innerliner 8 suppresses the permeation of air molecules and thus includes no cords.

Figure 2:
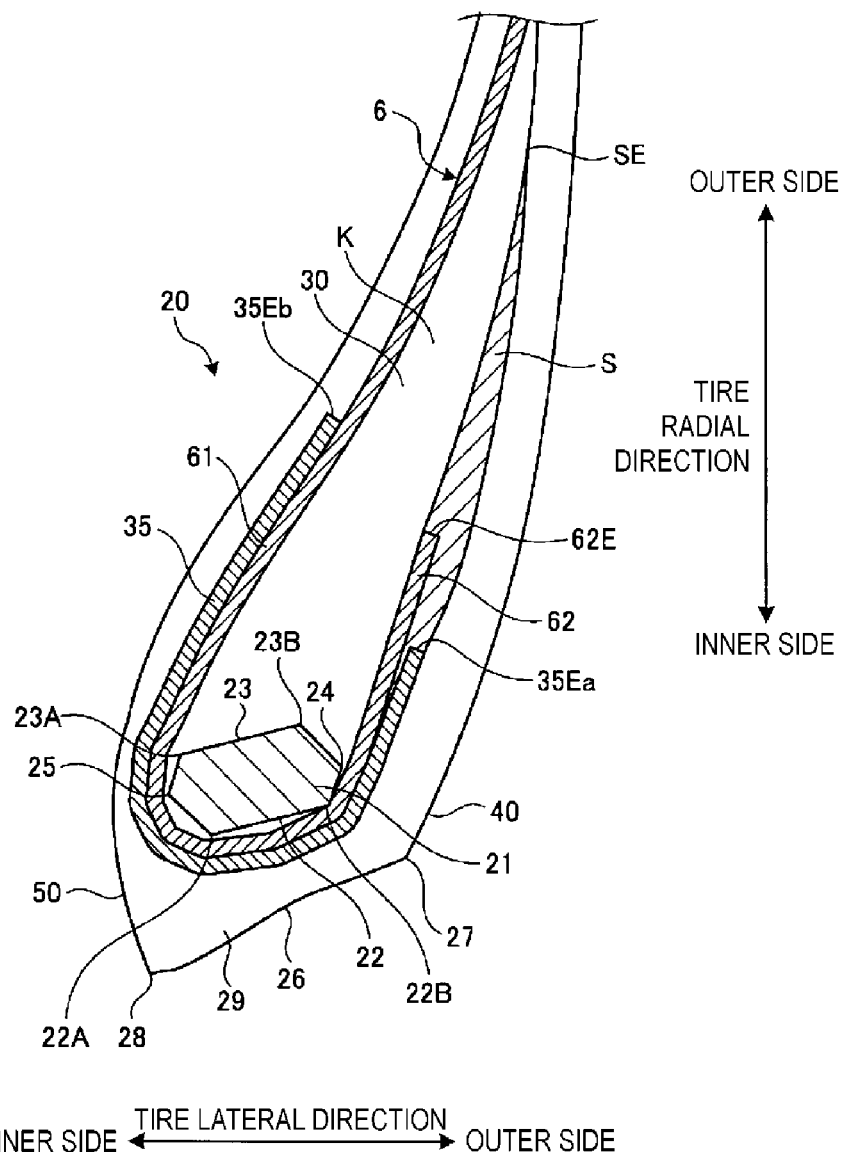
FIG. 2 is a detailed view of the portion Z of FIG. 1.

FIG. 2 is a detailed view of the portion Z of FIG. 1. A steel cord reinforcing layer 35 including a steel cord is disposed in the portion where the carcass layer 6 is folded back around the bead core 21. The steel cord reinforcing layer 35 is disposed adjacent to the outer surface of the carcass layer 6 folded back at the bead core 21 and reinforces the carcass layer 6. The steel cord reinforcing layer 35 is disposed layering on the carcass layer 6 on the outer side of the folded back portion 62 of the carcass layer 6. Also, in a similar manner to that of the carcass layer 6, the steel cord reinforcing layer 35 is folded back around the bead core 21 from the inner side to the outer side in the tire lateral direction and is disposed continuously in the tire circumferential direction. That is, the steel cord reinforcing layer 35 is located inward of the carcass layer 6 in the tire lateral direction at the portion where the carcass layer 6 is located inward of the bead core 21 in the tire lateral direction and is located outward of the carcass layer 6 in the tire lateral direction at the portion where the carcass layer 6 is located further outward than the bead core 21 in the tire lateral direction.

The bead core 21 is formed by winding a bead wire 21A (see FIG. 4) into an annular shape. The bead core 21 when viewed in a meridian cross-section has a substantially hexagonal cross-sectional shape. Specifically, the bead core 21 includes a bottom side 22 corresponding to the inner surface in the tire radial direction and a top side 23 corresponding to the outer surface in the tire radial direction. The bottom side 22 and the top side 23 are substantially parallel with one another and are inclined in a direction inward in the tire radial direction as they extend from the outer side to the inner side in the tire lateral direction. Additionally, in the bead core 21, the outer end of the bottom side 22 and the outer end of the top side 23 in the tire lateral direction are defined as a bottom outer corner portion 22B and a top outer corner portion 23B, respectively. The bead core 21 also includes an outer projection corner portion 24 that projects located at a position outward from the outer corner portions 22B and 23B in the tire lateral direction. Furthermore, in the bead core 21, the inner end of the bottom side 22 and the inner end of the top side 23 in the tire lateral direction are defined as a bottom inner corner portion 22A and a top inner corner portion 23A, respectively. The bead core 21 also includes an inner projection corner portion 25 that projects located at a position inward from the outer corner portions 22A and 23A in the tire lateral direction. In this way, the bead core 21 is formed with a substantially hexagonal cross-sectional shape. The bottom side 22 is the surface of the bead core 21 facing inward in the tire radial direction of the bead core 21, and the top side 23 is the surface of the bead core 21 facing outward in the tire radial direction.

In the present embodiment, as viewed in the meridian cross-section of the pneumatic tire 1, out of the six sides of the substantially hexagonal bead core 21, the bottom side 22 and the top side 23 are long in length. The bottom side 22 or the top side 23 may be the longest side.

Additionally, a bead base portion 26, which is the inner circumferential surface of the bead portion 20, is inclined in a direction inward in the tire radial direction as it extends from the outer side to the inner side in the tire lateral direction, in a similar manner to that of the bottom side 22 and the top side 23 of the bead core 21. Note that the inner circumferential surface of the bead portion 20 is the surface of the bead portion 20 facing inward in the tire radial direction and forming the inner contour in the tire radial direction. In other words, the bead base portion 26 is inclined so that a bead toe portion 28, which is the inner end portion of the bead base portion 26 in the tire lateral direction, is located further inward in the tire radial direction than a bead heel portion 27, which is the outer end portion of the bead base portion 26 in the tire lateral direction. The bead base portion 26 is provided as an engaging portion that engages to come into contact with a specified rim when the pneumatic tire according to the present embodiment 1 is mounted on the specified rim.

The bead base portion 26 includes a rim cushion rubber 29. The rim cushion rubber 29 is a rubber layer that constitutes the contact surface with the specified rim. The rim cushion rubber 29 is disposed both inward in the tire radial direction and outward in the tire lateral direction of the bead core 21 and the folded back portion 62. The bead base portion 26 is formed by the rim cushion rubber 29.

In the bead portion 20, a bead outer surface portion 40 is formed curved in a direction projecting outward in the tire lateral direction. In other words, the bead outer surface portion 40, which is a surface of the pneumatic tire 1 located on the side exposed to the outside air, is curved projecting outward in the tire lateral direction in the region of the bead portion 20. The bead heel portion 27, which is the outer end of the bead base portion 26 in the tire lateral direction, is an intersection point H between the bead outer surface portion 40 and the bead base portion 26.

In the bead portion 20, a tire inner surface 50 is formed curved in a direction projecting inward in the tire lateral direction. In other words, the tire inner surface 50, which is a surface of the pneumatic tire 1 located on the side filled with air, is curved projecting inward in the tire lateral direction in the region of the bead portion 20. The bead toe portion 28, which is another end portion of the bead base portion 26, is an intersection point between the tire inner surface 50 and the bead base portion 26.

Additionally, the bead portion 20 is provided with a cover member 30 that covers the bead core 21, with at least a portion of the cover member 30 disposed in the space between the body portion 61 and the folded back portion 62 of the carcass layer 6. The cover member 30 mainly includes a bead rubber layer K called a bead filler. The bead rubber layer K is disposed within the bead portion 20 with the inner side in the tire lateral direction being disposed along the body portion 61 of the carcass layer 6 and the outer side in the tire lateral direction being disposed to extend further outward in the tire radial direction than an outer edge portion 62E of the folded back portion 62 of the carcass layer 6 that faces outward in the tire radial direction.

A reinforcing rubber layer S is disposed within the bead portion 20 adjacent to the outer surface of the bead rubber layer K in the tire lateral direction, the outer edge portion 62E of the folded back portion 62 facing outward in the tire radial direction, and an outer edge portion 35Ea of the steel cord reinforcing layer 35 in the tire lateral direction facing outward in the tire radial direction. In a meridian cross section, the reinforcing rubber layer S is disposed to extend in the tire radial direction along the outer surface of the bead rubber layer K in the tire lateral direction. The reinforcing rubber layer S has a JIS-A hardness greater than the JIS-A hardness of the bead rubber layer K and less than the JIS-A hardness of the coating rubber of the carcass layer 6 and the JIS-A hardness of the steel cord reinforcing layer 35. In an embodiment in which the bead rubber layer K includes two layers, the JIS-A hardness of the reinforcing rubber layer S is greater than the hardness of the bead rubber layer K on the side adjacent to the reinforcing rubber layer S. Note that the JIS-A hardness is a value measured by a type A durometer according to JIS K6253-3:2012.

The outer edge portion 62E of the folded back portion 62 is disposed further outward in the tire radial direction than the outer edge portion 35Ea of the steel cord reinforcing layer 35. An outer edge portion SE of the reinforcing rubber layer S is disposed further outward in the tire radial direction than the outer edge portion 62E of the folded back portion 62. An inner edge portion on the inner side of the steel cord reinforcing layer 35 in the tire lateral direction that faces outward in the tire radial direction is disposed further outward in the tire radial direction than the outer edge portion 35Ea and terminates partway along the body portion 61 of the carcass layer 6.

Figure 3:
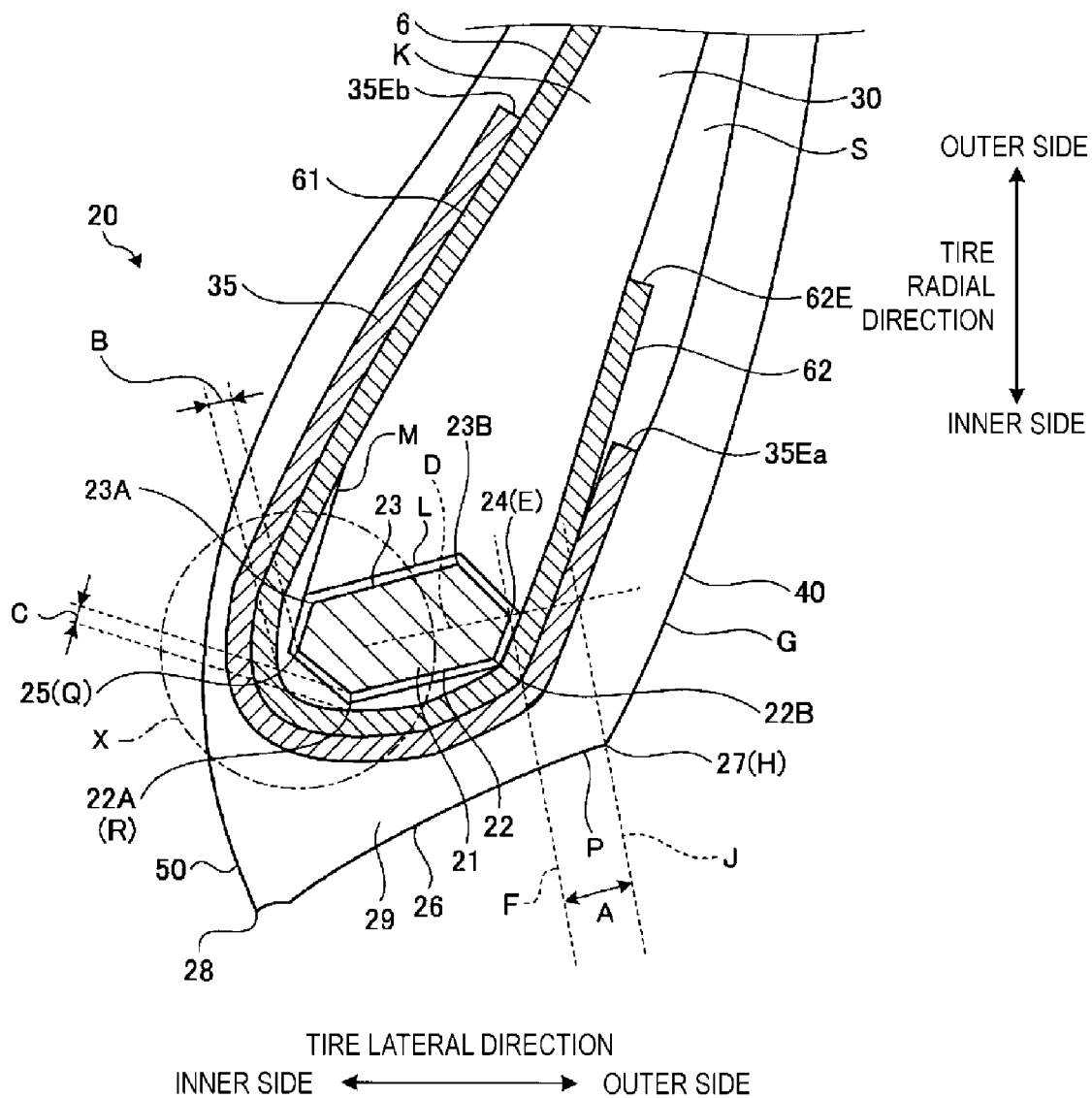
FIG. 3 is an enlarged view of a portion illustrated in FIG. 2.
Figure 4:
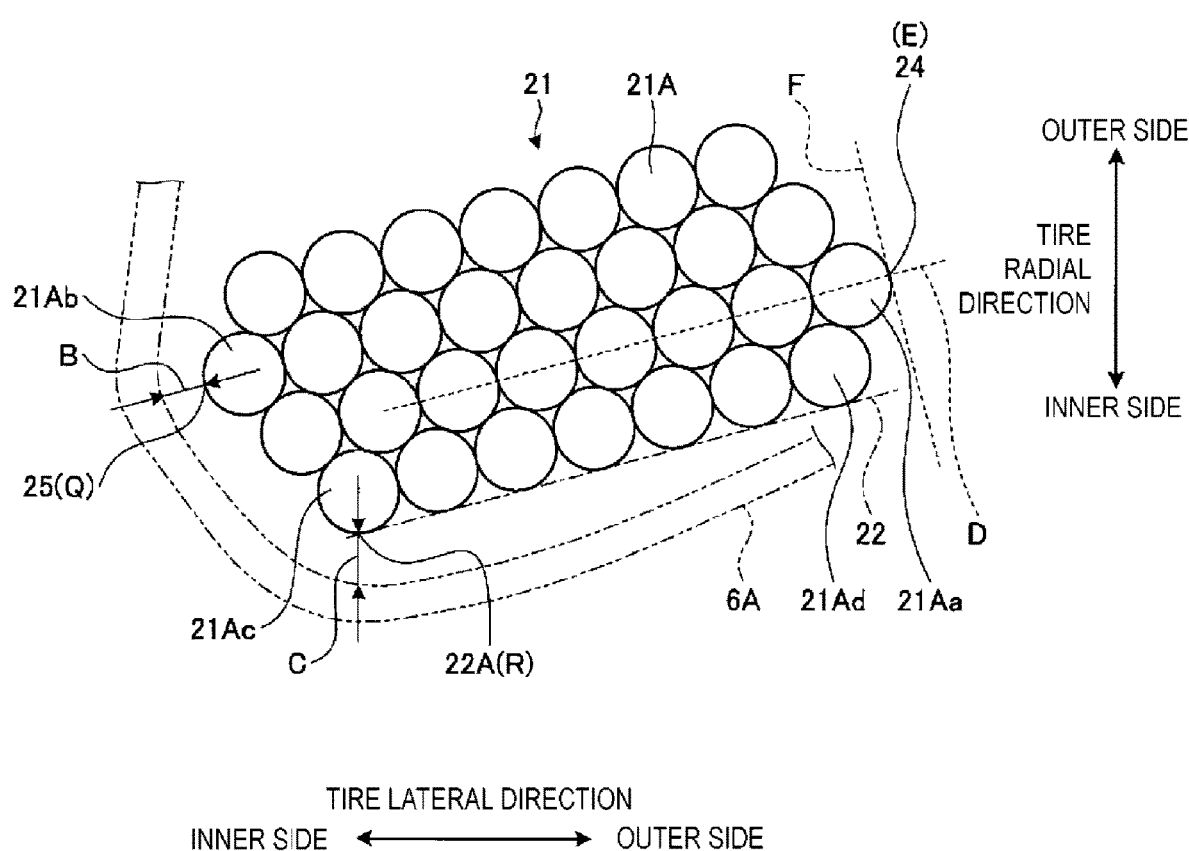
FIG. 4 is a detailed view of a bead core.

FIG. 3 is an enlarged view of a portion illustrated in FIG. 2. FIG. 4 is a detailed view of a bead core. The specified values of the dimensions and the like of constituents of the bead portion 20 according to the present embodiment will be described below while referring to FIGS. 2 to 4. The specified values described below are specified values when the pneumatic tire 1 is not mounted on a specified rim. That is, the specified values are specified values of the pneumatic tire 1 in an attitude before being mounted on a specified rim, or in other words, the specified values in the meridian cross-section of the pneumatic tire 1 after vulcanization molding by a mold.

As illustrated in FIG. 3, in the meridian cross-section of the bead portion 20, a first line segment D, a second line segment F, and a third line segment J are specified. The first line segment D is a straight line that is parallel with the innermost bottom side 22 of the bead core 21 in the tire radial direction and passes through an outermost outer projection point E of the bead core 21 in the tire lateral direction. The second line segment F is a straight line that is orthogonal with the first line segment D at the position of the outer projection point E. The third line segment J is a straight line that is orthogonal with the first line segment D and passes through the intersection point H of the rim cushion rubber 29.

As illustrated in FIG. 3, the intersection point H of the rim cushion rubber 29 corresponds to the bead heel portion 27 of the rim cushion rubber 29 described above. Specifically, the intersection point H is the point where a side P and a curved line G meet. The side P is the outer side of the bead base portion 26 in the tire lateral direction that forms the contour of the inner surface of the bead portion 20 in the tire radial direction. The curved line G is a curved line that forms the bead outer surface portion 40 that forms the contour of the outer surface of the bead portion 20 in the tire lateral direction located further outward in the tire lateral direction than the bead base portion 26.

Note that the bottom side 22 of the bead core 21 corresponds to the inner surface of the bead core 21 in the tire radial direction as described above. Specifically, as illustrated in FIG. 4, looking at the bead wire 21A that forms the bead core 21, the bottom side 22 is a tangent line shared by a bead wire 21Ac and a bead wire 21Ad. The bead wire 21Ac is the bead wire of the bead wires 21A that form the bead core 21 located at the innermost in the tire lateral direction and innermost in the tire radial direction. The bead wire 21Ad is the bead wire of the bead wires 21A located at the outermost in the tire lateral direction and innermost in the tire radial direction. Accordingly, the first line segment D is a straight line parallel with this tangent line.

Additionally, the outer projection point E corresponds to the outer projection corner portion 24 described above. Specifically, as illustrated in FIG. 4, looking at the bead wire 21A that forms the bead core 21, the outer projection point E is an outermost point on the contour of a bead wire 21Aa in the tire lateral direction, the bead wire 21Aa is located at the outermost in the tire lateral direction among the bead wires 21A that form the bead core 21. Thus, the first line segment D is a straight line passing through the center of the bead wire 21Aa, and the second line segment F is a tangent line of the contour of the bead wire 21Aa.

In the present embodiment, a distance A between the second line segment F and the third line segment J is from 2.0 mm to 4.0 mm.

In the present embodiment, a shortest distance B between an innermost inner projection point Q of the bead core 21 in the tire lateral direction and the carcass cords 6A of the carcass layer 6 is from 0.6 mm to 1.4 mm. The inner projection point Q corresponds to the inner projection corner portion 25 described above. Specifically, as illustrated in FIG. 4, looking at the bead wire 21A that forms the bead core 21, the inner projection point Q is an innermost point on the contour of a bead wire 21Ab in the tire lateral direction, the bead wire 21Ab is located at the innermost in the tire lateral direction among the bead wires 21A that form the bead core 21. Accordingly, the shortest distance B is the shortest distance between the contour of the bead wire 21Ab and the carcass cords 6A.

In the present embodiment, a shortest distance C between an innermost end R of the bottom side 22 of the bead core 21 in the tire lateral direction and the carcass cords 6A of the carcass layer 6 is from 1.2 mm to 2.2 mm. As illustrated in FIG. 4, the innermost end R of the bottom side 22 in the tire lateral direction is a point on the contour of the bead wire 21Ac that forms the bottom side 22. Accordingly, the shortest distance C is the shortest distance between the contour of the bead wire 21Ac and the carcass cords 6A.

In this way, the pneumatic tire 1 of the present embodiment includes the pair of bead cores 21 disposed on either side in the tire lateral direction, each one of the pair of bead cores 21 being formed by the bead wire 21A being wound a plurality of times in the tire circumferential direction, the carcass layer 6 including an each end portion folded back on each one of the pair of bead cores 21, the cover member 30 covering the bead core 21 disposed on a folded back inner side of the carcass layer 6, the steel cord reinforcing layer 35 disposed adjacent to the folded back outer surface of the carcass layer 6, and the rim cushion rubber 29 disposed adjacent to the outer surface of the steel cord reinforcing layer 35 and including the bead base portion 26 and the bead outer surface portion 40, the bead base portion 26 forming the contour of the inner surface of the bead portion 20 in the tire radial direction, and the bead outer surface portion 40 forming the contour of the outer surface of the bead portion 20 in the tire lateral direction continuous to the outer end of the bead base portion 26 in the tire lateral direction via the intersection point H, wherein in a meridian cross-section under a state with the pneumatic tire 1 not mounted on a rim, a line segment being parallel with the innermost bottom side 22 of the bead core 21 in the tire radial direction and passing through the outermost outer projection point E of the bead core 21 in the tire lateral direction is specified as the first line segment D, a line segment being orthogonal with the first line segment D at the position of the outer projection point E is specified as the second line segment F, and a line segment being orthogonal with the first line segment D and passing through the intersection point H of the rim cushion rubber 29 is specified as the third line segment J, the distance A between the second line segment F and the third line segment J is from 2.0 mm to 4.0 mm, the shortest distance B between the innermost inner projection point Q of the bead core 21 in the tire lateral direction and the carcass cords 6A of the carcass layer 6 is from 0.6 mm to 1.4 mm, and the shortest distance C between the innermost end R of the bottom side 22 of the bead core 21 in the tire lateral direction and the carcass cords 6A of the carcass layer 6 is from 1.2 mm to 2.2 mm.

According to the pneumatic tire 1, by the shortest distance B being 0.6 mm or greater and the shortest distance C being 1.2 mm or greater, the excessive restriction of the carcass layer 6 is alleviated when the pneumatic tire 1 is formed via vulcanization. Thus, the outward-acting pressure on the bead core 21 in the tire lateral direction during vulcanization can be reduced, and pressing on the bead core 21 to the bead heel portion 27 side can be suppressed. As a result, the bead core 21 can be disposed close to the bead toe portion 28. When the shortest distance B is greater than 1.4 mm and the shortest distance C is greater than 2.2 mm, the restricting force on the carcass layer 6 is dramatically decreased. This may incite unpreferable cracking from the outer edge portion 62E of the folded back carcass layer 6. By setting the distance A to 2.0 mm or greater, the bead core 21 can be disposed close to the bead toe portion 28, and the lifting of the bead toe portion 28 can be prevented. Additionally, by setting the distance A to 4.0 mm or less, an excessive increase in the rubber volume between the bead core 21 and the steel cord reinforcing layer 35 located outward of the bead core in the tire lateral direction is suppressed. This allows the heat build-up of the bead portion 20 to be suppressed to within an incident-free predetermined range.

As illustrated in FIG. 3, the pneumatic tire 1 of the present embodiment includes the cover member 30. The cover member 30 includes a bead cover layer L surrounding the bead core 21 and a filler cover layer M disposed adjacent to the outer surface of the bead cover layer L and along the inner surface of the carcass layer 6. The filler cover layer M is disposed to extend outward in the tire radial direction along the carcass layer 6 beyond an area X of 15 mm or greater centered on the inner projection point Q of the bead core 21. Preferably, the JIS-A hardness of the rubber layer constituting the filler cover layer M is from 68 to 76 and the JIS-A hardness of the rubber layer constituting the filler cover layer M is less than the JIS-A hardness of the rubber layer that constitutes the bead cover layer L.

The JIS-A hardness of the rubber layer is a value measured by a type A durometer according to JIS K6253-3:2012.

According to the pneumatic tire 1, by disposing the filler cover layer M, an effect of alleviating restriction on the carcass layer 6 can be significantly obtained. As a result, the bead core 21 can be disposed close to the bead toe portion 28 and distance A can be ensured. When the JIS-A hardness of the rubber layer constituting the filler cover layer M is 68 or greater, the excessive rubber flow can be suppressed during vulcanization. As a result, the bead core 21 can be disposed close to the bead toe portion 28. When the JIS-A hardness of the rubber layer constituting the filler cover layer M is 76 or less, an effect of alleviating the restricting force on the carcass layer 6 during vulcanization can be ensured. As a result, the bead core 21 can be disposed close to the bead toe portion 28. By the JIS-A hardness of the rubber layer constituting the filler cover layer M being less (softer) than the JIS-A hardness of the rubber layer constituting the bead cover layer L, an effect of alleviating the restricting force on the carcass layer 6 during vulcanization and an effect of suppressing the excessive rubber flow can be obtained in a compatible manner.

Additionally, in the pneumatic tire 1 of the present embodiment, one of the filler cover layer M or the bead cover layer L is preferably a two-layer structure laminating a rubber layer and a nylon reinforcing layer, and the thickness of the rubber layer associated with the shortest distance B is preferably 0.5 mm or greater.

The nylon reinforcing layer includes nylon fibers disposed in parallel in a rubber layer. Additionally, the rubber layer includes a simple rubber layer or a rubber layer that includes short fibers.

In the pneumatic tire 1, one of the filler cover layer M or the bead cover layer L is a two-layer structure laminating a rubber layer and a nylon reinforcing layer, so that the shortest distances B and C can be secured without deteriorating the heat build-up. When the thickness of the rubber layer associated with the shortest distance B is 0.5 mm or greater, an effect of alleviating the restricting force on the carcass layer 6 during vulcanization can be sufficiently ensured. As a result, the bead core 21 can be disposed close to the bead toe portion 28.

Second Embodiment

Figure 5:
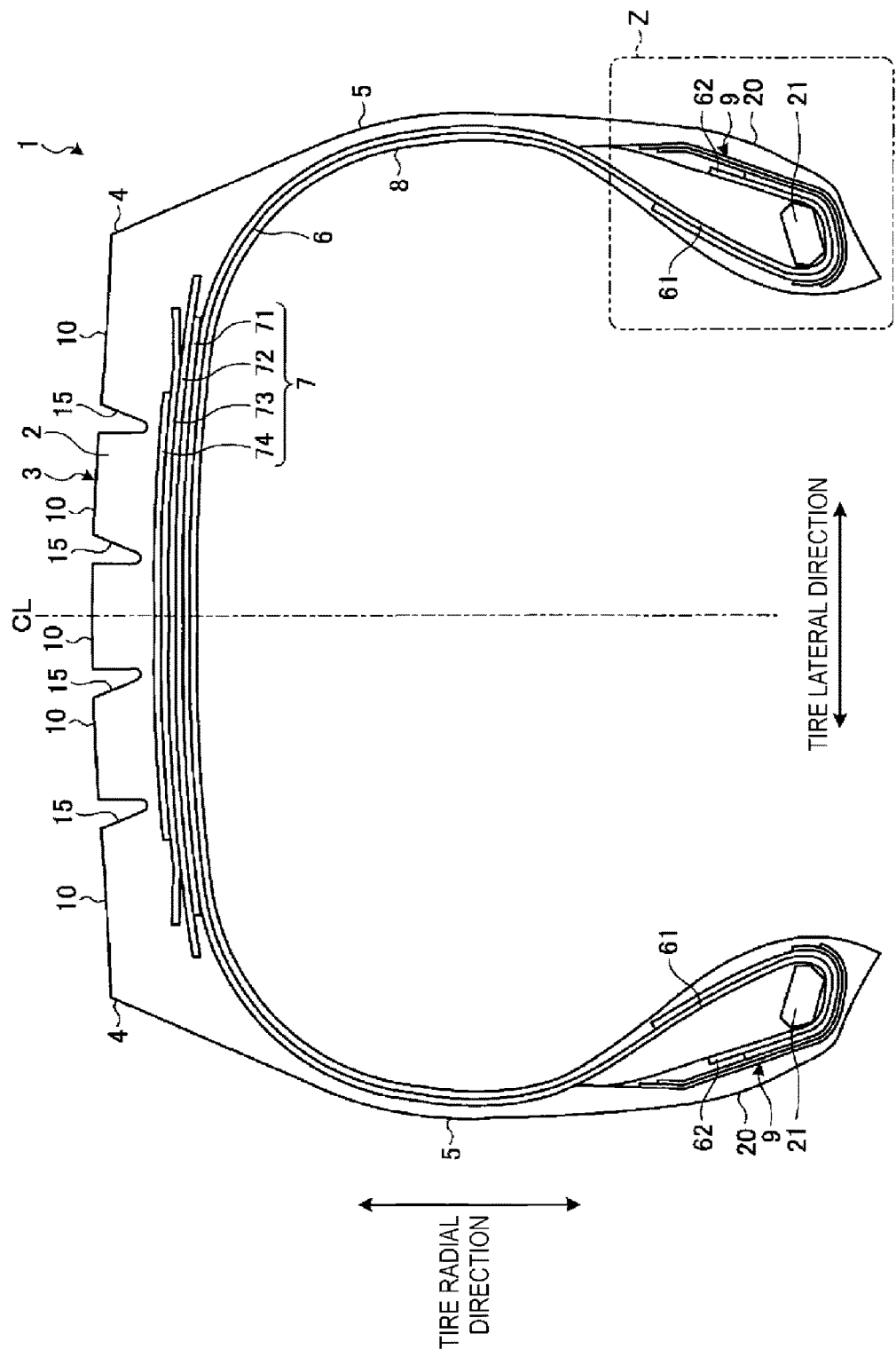
FIG. 5 is a meridian cross-sectional view illustrating a main portion of a pneumatic tire according to a second embodiment.
Figure 6:
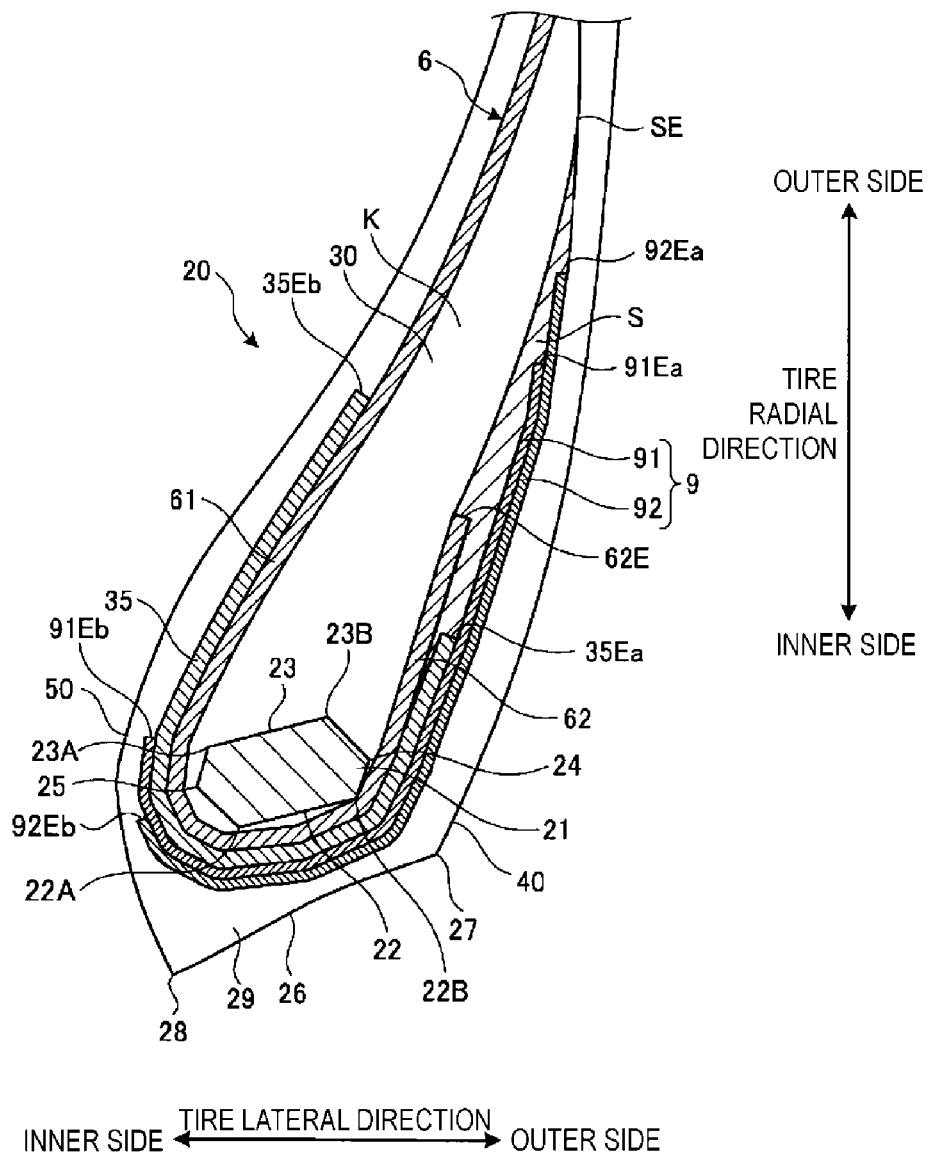
FIG. 6 is a detailed view of the portion Z of FIG. 5.
Figure 7:
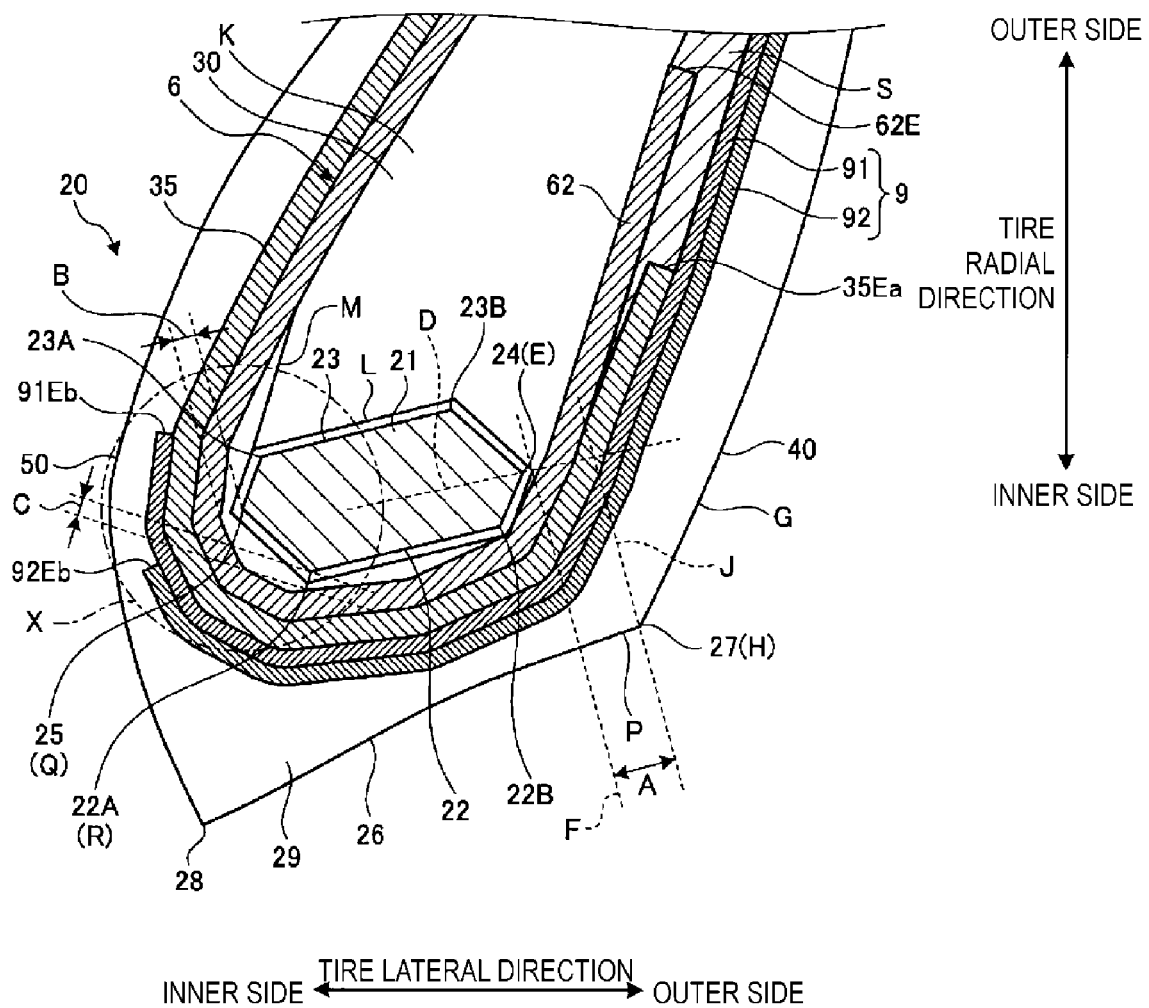
FIG. 7 is an enlarged view of a portion illustrated in FIG. 6.

FIG. 5 is a meridian cross-sectional view illustrating a main portion of a pneumatic tire according to a second embodiment. FIG. 6 is a detailed view of the portion Z of FIG. 5. FIG. 7 is an enlarged view of a portion illustrated in FIG. 6.

The second embodiment has a similar configuration to that of the first embodiment described above except that an organic fiber reinforced layer 9 is provided. Thus, in the following description of the second embodiment, constituents identical to those of the first embodiment have the same reference sign, and detailed descriptions thereof are omitted.

The organic fiber reinforcing layer 9 is called a nylon chafer and is disposed further outward in the tire lateral direction than the folded back portion 62 of the carcass layer 6. The organic fiber reinforced layer 9 includes an inner reinforcing layer 91 disposed adjacent to the steel cord reinforcing layer 35 and an outer reinforcing layer 92 disposed adjacent to the outer surface of the inner reinforcing layer 91.

The inner reinforcing layer 91 is disposed layering on the steel cord reinforcing layer 35 on the outer side in the tire lateral direction of the portion of the steel cord reinforcing layer 35 that is folded back along the carcass layer 6. Also, in a similar manner to that of the carcass layer 6 and the steel cord reinforcing layer 35, the inner reinforcing layer 91 is folded back around the bead core 21 from the inner side to the outer side in the tire lateral direction and is disposed continuously in the tire circumferential direction.

The outer reinforcing layer 92 is disposed layering on the inner reinforcing layer 91 on the outer side in the tire lateral direction of the portion of the inner reinforcing layer 91 that is folded back. Also, in a similar manner to that of the carcass layer 6, the steel cord reinforcing layer 35, and the inner reinforcing layer 91, the outer reinforcing layer 92 is folded back around the bead core 21 from the inner side to the outer side in the tire lateral direction and is disposed continuously in the tire circumferential direction.

The reinforcing rubber layer S is disposed within the bead portion 20 adjacent to the outer surface of the bead rubber layer K in the tire lateral direction, the inner surface of the organic fiber reinforced layer 9 in the tire lateral direction, outer edge portions 91Ea and 92Ea facing outward in the tire radial direction, the outer edge portion 62E of the folded back portion 62 facing outward in the tire radial direction, and an outer edge portion 35Ea of the steel cord reinforcing layer 35 in the tire lateral direction facing outward in the tire radial direction. In a meridian cross section, the reinforcing rubber layer S is disposed to extend in the tire radial direction along the outer surface of the bead rubber layer K in the tire lateral direction. The reinforcing rubber layer S has JIS-A hardness greater than the hardness of the bead rubber layer K and less than the JIS-A hardness of the coating rubber of the carcass layer 6 and the JIS-A hardness of the steel cord reinforcing layer 35. In an embodiment in which the bead rubber layer K includes two layers, the JIS-A hardness of the reinforcing rubber layer S is greater than the hardness of the bead rubber layer K on the side adjacent to the reinforcing rubber layer S. Note that the JIS-A hardness is a value measured by a type A durometer according to JIS K6253-3:2012.

The outer edge portions 91Ea and 92Ea of the organic fiber reinforced layer 9 are disposed further outward in the tire lateral direction than the folded back portion 62 (the outer edge portion 62E) of the carcass layer 6 and are disposed further outward in the tire radial direction than the folded back portion 62 of the carcass layer 6. Inner edge portions 91Eb and 92Eb, on the inner side of the organic fiber reinforced layer 9 in the tire lateral direction, that face outward in the tire radial direction are disposed further inward in the tire radial direction than the outer edge portion 35Ea and terminate partway along the steel cord reinforcing layer 35.

In this way, the pneumatic tire 1 of the present embodiment includes the pair of bead cores 21 disposed on either side in the tire lateral direction, each one of the pair of bead cores 21 being formed by the bead wire 21A being wound a plurality of times in the tire circumferential direction, the carcass layer 6 including an each end portion folded back on each one of the pair of bead cores 21, the cover member 30 covering the bead cores 21 disposed on a folded back inner side of the carcass layer 6, the steel cord reinforcing layer 35 disposed adjacent to the folded back outer surface of the carcass layer 6, at least one organic fiber reinforced layer 9 disposed along the outer surface of the steel cord reinforcing layer 35, and the rim cushion rubber 29 disposed adjacent to the outer surface of the organic fiber reinforced layer 9 and including the bead base portion 26 and the bead outer surface portion 40, the bead base portion 26 forming the contour of the inner surface of the bead portion 20 in the tire radial direction, and the bead outer surface portion 40 forming the contour of the outer surface of the bead portion 20 in the tire lateral direction continuous to the outer end of the bead base portion 26 in the tire lateral direction via the intersection point H, wherein in a meridian cross-section under a state with the pneumatic tire 1 not mounted on a rim, a line segment being parallel with the innermost bottom side 22 of the bead core 21 in the tire radial direction and passing through the outermost outer projection point E of the bead core 21 in the tire lateral direction is specified as the first line segment D, a line segment being orthogonal with the first line segment D at the position of the outer projection point E is specified as the second line segment F, and a line segment being orthogonal with the first line segment D and passing through the intersection point H of the rim cushion rubber 29 is specified as the third line segment J, the number of organic fiber reinforced layer 9 is from 1 to 3, and the thickness d per each of the at least one organic fiber reinforced layer 9 is from 0.7 mm to 1.2 mm, the distance A between the second line segment F and the third line segment J is from n×d+2.0 mm to n×d+4.0 mm, the shortest distance B between the innermost inner projection point Q of the bead core 21 in the tire lateral direction and the carcass cords 6A of the carcass layer 6 is from 0.6 mm to 1.4 mm, and the shortest distance C between the innermost end R of the bottom side 22 of the bead core 21 in the tire lateral direction and the carcass cords 6A of the carcass layer 6 is from 1.2 mm to 2.2 mm.

According to the pneumatic tire 1, by the shortest distance B being 0.6 mm or greater and the shortest distance C being 1.2 mm or greater, the excessive restriction of the carcass layer 6 is alleviated when the pneumatic tire 1 is formed via vulcanization. Thus, the outward-acting pressure on the bead core 21 in the tire lateral direction during vulcanization can be reduced, and pressing on the bead core 21 to the bead heel portion 27 side can be suppressed. As a result, the bead core 21 can be disposed close to the bead toe portion 28. When the shortest distance B is greater than 1.4 mm and the shortest distance C is greater than 2.2 mm, the restricting force on the carcass layer 6 is dramatically decreased. This may incite unpreferable cracking from the outer edge portion 62E of the folded back carcass layer 6. By setting the distance A to n×d+2.0 mm or greater, the bead core 21 can be disposed close to the bead toe portion 28, and the lifting of the bead toe portion 28 can be prevented. Additionally, by setting the distance A to n×d+4.0 mm or less, an excessive increase in the rubber volume between the bead core 21 and the steel cord reinforcing layer 35 located outward of the bead core in the tire lateral direction is suppressed. This allows the heat build-up of the bead portion 20 to be suppressed to within an incident-free predetermined range.

As illustrated in FIG. 7, the pneumatic tire 1 of the present embodiment includes the cover member 30. The cover member 30 includes the bead cover layer L surrounding the bead core 21 and the filler cover layer M disposed adjacent to the outer surface of the bead cover layer L and along the inner surface of the carcass layer 6. The filler cover layer M is disposed to extend outward in the tire radial direction along the carcass layer 6 beyond an area X of 15 mm or greater centered on the inner projection point Q of the bead core 21. Preferably, the JIS-A hardness of the rubber layer constituting the filler cover layer M is from 68 to 76 and is less than the JIS-A hardness of the rubber layer constituting the bead cover layer L.

The JIS-A hardness of the rubber layer is a value measured by a type A durometer according to JIS K6253-3:2012.

According to the pneumatic tire 1, by disposing the filler cover layer M, an effect of alleviating restriction on the carcass layer 6 can be significantly obtained. As a result, the bead core 21 can be disposed close to the bead toe portion 28 and distance A can be ensured. When the JIS-A hardness of the rubber layer constituting the filler cover layer M is 68 or greater, the excessive rubber flow can be suppressed during vulcanization. As a result, the bead core 21 can be disposed close to the bead toe portion 28. When the JIS-A hardness of the rubber layer constituting the filler cover layer M is 76 or less, an effect of alleviating the restricting force on the carcass layer 6 during vulcanization can be ensured. As a result, the bead core 21 can be disposed close to the bead toe portion 28. By the JIS-A hardness of the rubber layer constituting the filler cover layer M being less (softer) than the JIS-A hardness of the rubber layer constituting the bead cover layer L, an effect of alleviating the restricting force on the carcass layer 6 during vulcanization and an effect of suppressing the excessive rubber flow can be obtained in a compatible manner.

Additionally, in the pneumatic tire 1 of the present embodiment, one of the filler cover layer M or the bead cover layer L is preferably a two-layer structure laminating a rubber layer and a nylon reinforcing layer, and the thickness of the rubber layer associated with the shortest distance B is preferably 0.5 mm or greater.

The nylon reinforcing layer includes nylon fibers disposed in parallel in a rubber layer. Additionally, the rubber layer includes a simple rubber layer or a rubber layer that includes short fibers.

In the pneumatic tire 1, one of the filler cover layer M or the bead cover layer L is a two-layer structure laminating a rubber layer and a nylon reinforcing layer, so that the shortest distances B and C can be secured without deteriorating the heat build-up. When the thickness of the rubber layer associated with the shortest distance B is 0.5 mm or greater, an effect of alleviating the restricting force on the carcass layer 6 during vulcanization can be sufficiently ensured. As a result, the bead core 21 can be disposed close to the bead toe portion 28.

Examples

In the examples, performance tests for lifting amount reduction performance on bead toe portion, separation durability performance on outer edge portion of carcass layer folded back portion, and heat build-up resistance performance on bead portion were performed on a plurality of types of pneumatic tires with different conditions (see FIGS. 8A-8B and 9A-9B).

In the performance tests, a pneumatic tire having a size of 275/70R22.5 size is mounted on a specified rim, the internal pressure is set to 75% of the specified air pressure, and loaded with 1.4 times the specified load. Evaluation is performed after running for 40000 km on an indoor drum testing machine at a running speed of 49 km/h.

Here, "specified rim" refers to an "applicable rim" specified by the Japan Automobile Tyre Manufacturers Association Inc. (JATMA), a "Design Rim" specified by the Tire and Rim Association, Inc. (TRA), or a "Measuring Rim" specified by the European Tyre and Rim Technical Organisation (ETRTO). "Specified air pressure" refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. "Specified load" refers a "maximum load capacity" specified by JATMA, the maximum value in "TIRE LOAD LIMITS AT VARIOUS COLD INFLATION PRESSURES" specified by TRA, or "LOAD CAPACITY" specified by ETRTO.

For the evaluation of the lifting amount reduction performance on bead toe portion, the lifting amount is measured by calculating the amount of change in the bead toe inner circumferential length before and after the running test. The measurement results are expressed as index values and evaluated as shown in FIGS. 8A-8B, with Conventional Example 1 being assigned as the reference (100). In this evaluation, larger values indicate excellent lifting amount reduction performance on bead toe portion, and 115 or greater indicates an improved lifting amount reduction performance on bead toe portion. Also, the measurement results are expressed as index values and evaluated as shown in FIGS. 9A-9B, with Conventional Example 2 being assigned as the reference (100). In this evaluation, larger values indicate excellent lifting amount reduction performance on bead toe portion, and 160 or greater indicates an improved lifting amount reduction performance on bead toe portion.

For the evaluation of the separation durability performance on outer edge portion of carcass layer folded back portion, after the running test, at eight section in the tire circumferential direction as viewed in the meridian cross-section, the sum of the lengths of cracks originating from the outer edge portion of the carcass layer folded back portion is measured. The measurement results are expressed as index values and evaluated as shown in FIGS. 8A-8B, with Conventional Example 1 being assigned as the reference (100). In this evaluation, larger values indicate excellent separation durability performance on outer edge portion of carcass layer folded back portion, and 85 or greater indicates that the separation durability performance can be suppressed to within an incident-free range. The measurement results are expressed as index values and evaluated as also shown in FIGS. 9A-9B, with Conventional Example 2 being assigned as the reference (100). In this evaluation, larger values indicate excellent separation durability performance on outer edge portion of carcass layer folded back portion, and 83 or greater indicates that the separation durability performance can be suppressed to within an incident-free range.

For the evaluation of heat build-up resistance performance on bead portion, the maximum value for the amount of heat build-up in the bead portion during running is measured via thermography. The measurement results are expressed as index values and evaluated as shown in FIGS. 8A-8B and 9A-9B, with Conventional Examples 1 and 2, respectively, being assigned as the reference (100). In this evaluation, larger values indicate excellent heat build-up resistance performance on bead portion, and 80 or greater indicates that heat build-up in the bead portion can be suppressed to within an incident-free range.

As indicated in FIGS. 8A-8B, Conventional Example 1, Comparative Examples 1 to 3, and Examples 1 to 6 do not include an organic fiber reinforced layer. As indicated in FIGS. 9A-9B, Conventional Example 2, Comparative Examples 4 to 6, and Examples 7 to 10 include an organic fiber reinforced layer.

As indicated by the test results of FIGS. 8A-8B and 9A-9B, the pneumatic tires of Examples 1 to 10 have enhanced lifting amount reduction performance on bead toe portion, maintained separation durability performance on outer edge portion of carcass layer folded back portion, and maintained heat build-up resistance performance on bead portion within a permissible range.

The invention claimed is:

1. A pneumatic tire, comprising:
a pair of bead portions;
a pair of bead cores disposed one in each bead portion, each one of the pair of bead cores being formed by a bead wire being wound a plurality of times in a tire circumferential direction;
a carcass layer including each end portion being folded back on a respective one of the pair of bead cores from inside to outside in a tire lateral direction;
a cover member covering each bead core and being disposed on a respective folded back laterally inner side of the carcass layer;
a steel cord reinforcing layer disposed one adjacent to each folded back laterally outer side of the carcass layer; and
an organic fiber reinforcement disposed one adjacent to a laterally outer surface of each steel cord reinforcing layer, each organic fiber reinforcement having at least one organic fiber reinforced layer; and
a rim cushion rubber disposed one adjacent to a laterally outer surface of each organic fiber reinforcement and including a bead base portion and a bead outer surface portion, the bead base portion forming a contour of an inner surface of the respective bead portion in a tire radial direction, and the bead outer surface portion forming a contour of an outer surface of the respective bead portion in the tire lateral direction continuous to the outer end of the bead base portion in the tire lateral direction via an intersection point, wherein
in a meridian cross-section under a state with the pneumatic tire not mounted on a rim, each bead portion a line segment being parallel with an innermost bottom side of the bead core in the tire radial direction and passing through an outermost outer projection point of the bead core in the tire lateral direction is specified as a first line segment, a line segment being orthogonal with the first line segment at a position of the outer projection point is specified as a second line segment, a line segment being orthogonal with the first line segment and passing through the intersection point of the rim cushion rubber is specified as a third line segment, a number n of the organic fiber reinforced layer is from 1 to 3, and a thickness d per each of the at least one organic fiber reinforced layer is from 0.7 mm to 1.2 mm, a distance A between the second line segment and the third line segment is from n×d+2.0 mm to n×d+4.0 mm, a shortest distance B between an innermost inner projection point of the bead core in the tire lateral direction and a carcass cord of the carcass layer is from 0.6 mm to 1.4 mm, and a shortest distance C between an innermost end of the bottom side of the bead core in the tire lateral direction and a carcass cord of the carcass layer is from 1.2 mm to 2.2 mm.

2. The pneumatic tire according to claim 1, wherein each cover member includes a bead cover layer surrounding the bead core and a filler cover layer disposed adjacent to an outer surface of the bead cover layer and along an inner surface of the carcass layer, the bead cover layer comprising a rubber layer and the filler cover layer comprising another rubber layer, the respective filler cover layer is disposed to extend outward in the tire radial direction along the carcass layer beyond a circle of 15 mm radius centered on the inner projection point of the respective bead core, and a JIS-A hardness of the filler cover rubber layer is from 68 to 76 and is less than a JIS-A hardness of the bead cover layer rubber layer.

3. The pneumatic tire according to claim 2, wherein the filler cover layer in each bead portion or the bead cover layer in each bead portion is a two-layer structure laminating the rubber layer and a nylon reinforcing layer, and a total thickness of rubber associated with the shortest distance B is 0.5 mm or greater.

4. The pneumatic tire according to claim 1, wherein each cover member includes a bead cover layer surrounding the bead core and a filler cover layer disposed adjacent to an outer surface of the bead cover layer and along an inner surface of the carcass layer, the bead cover layer comprising a rubber layer and the bead filler comprising another rubber layer, the filler cover layer in each bead portion or the bead cover layer in each bead portion is a two-layer structure laminating the rubber layer and a nylon reinforcing layer, and a total thickness of rubber along the shortest distance B is 0.5 mm or greater.

* * * * *